Patented Oct. 18, 1938

2,133,779

UNITED STATES PATENT OFFICE 2,133,779

PRESERVING RUBBER

Albert M. Clifford, Stow, Ohio, assignor to Wingfoot Corporation, Wilmington, Del., a corporation of Delaware No Drawing. Application May 5, 1936,
Serial No. 78,007

13 Claims. (Cl. 18—50)

This invention relates to the treatment of rubber. More particularly it relates to a method of retarding the deterioration of rubber due to aging. This case is a continuation in part of application Serial No. 618,087 filed June 18, 1932. Many compounds have been suggested for use in rubber as antioxidants and age-resisters. By the present invention it has been discovered that still another class of materials is suitable for this purpose. These new antioxidants may be represented by the formula $R_1$—O—R—$NH_2$, in which R is an alkylene group and $R_1$ is an aryl group. This aryl group $R_1$ may contain various substituent groups, including amino groups, the above formula representing, in a general manner, the compounds falling within the scope of the invention and embracing species having substituents on the ring.

Following are the formulae of some representative compounds:

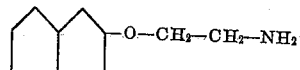

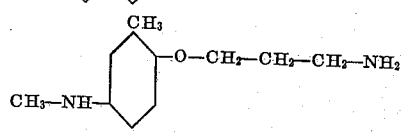

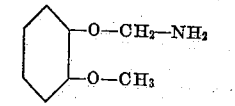

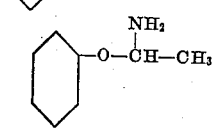

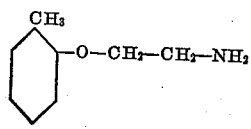

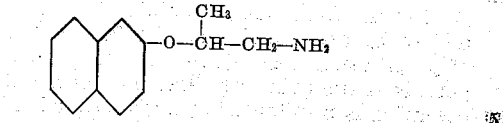

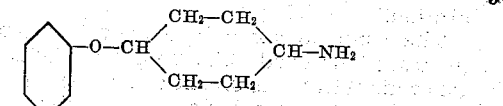

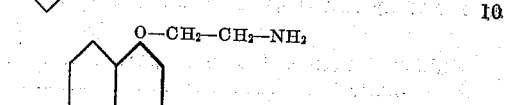

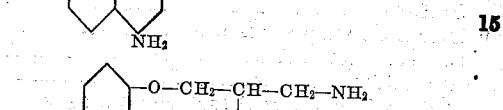

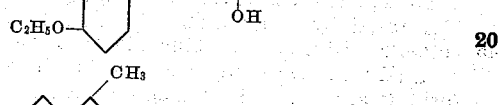

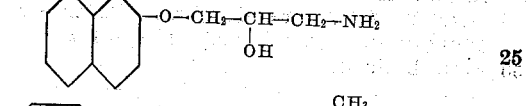

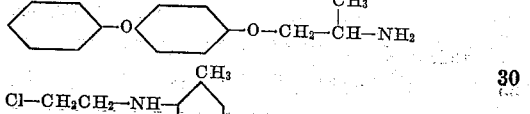

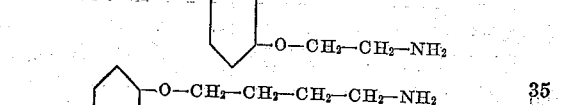

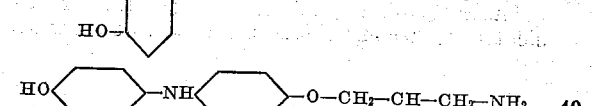

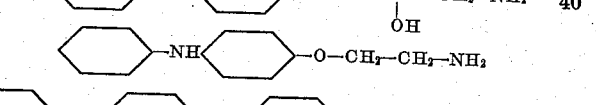

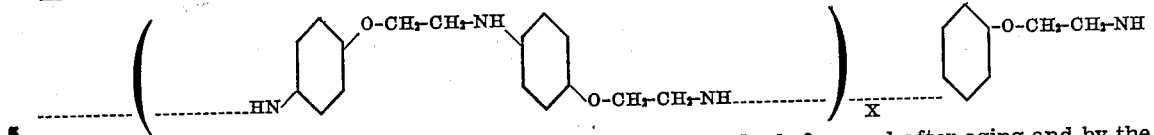

The foregoing compounds are but a few of those comprised by the invention and are, thus merely indicative of the variations possible while still conforming to the general formula as originally stated.

The type of compound herein described for use in rubber has been mentioned in the literature and methods of preparation set forth. For example, in Beilstein, 3rd ed. (1896), Vol. II, page 877, aminoethyl naphthyl ether is described and the statement made that the compound may be prepared by heating bromethyl naphthyl ether with an alcoholic solution of ammonia at 100° C. The product is a white amorphous material. Instead of the bromo-compound, other corresponding halogen compounds, such as chlorethyl naphthyl ether, may be employed if desired. The reaction is preferably carried out under pressure in an autoclave.

Other compounds coming within the purview of the invention may be prepared in this same manner, or by other methods. In fact, any method of preparation may be followed which gives compounds of the character herein described and the invention is not limited by such methods of preparation.

The compounds may be employed with success in most of the usual compounding formulae. The following formula is one in which they have been found by test to yield excellent results:

| | Parts by weight |
|---|---|
| Rubber (extracted pale crepe) | 100 |
| Zinc oxide | 5 |
| Sulfur | 3 |
| Hexamethylene tetramine | 1 |
| Stearic acid | 1.5 |
| Antioxidant | 1 |

The efficiency of these compounds is admirably illustrated by the action of beta-amino ethyl-beta-naphthyl ether. This material was incorporated into rubber in accordance with the above formula and samples were cured. These samples were tested before aging and after six days aging in an oxygen bomb. The following results were obtained:

| Cure | Original | | | | Aged 6 days $O_2$ bomb | | | | Percent inc. wt. |
|---|---|---|---|---|---|---|---|---|---|
| | Tens. | Elong. | 500 | 700 | Tens. | Elong. | 500 | 700 | |
| 35/285 | 128 | 885 | 15 | 45 | 123 | 870 | 15 | 44 | Lost wt. |
| 50 | 148 | 855 | 18 | 58 | 138 | 810 | 19 | 70 | .35 |
| 70 | 170 | 800 | 25 | 93 | 118 | 715 | 29 | 108 | Lost wt. |

The antioxidant qualities of the material are indicated by a comparison of the tensile strength of the samples before and after aging and by the low increase in weight shown, this latter being due to the oxygen absorbed during aging.

Although only the preferred forms of the invention have been described in detail, it will be apparent to those skilled in the art that various modifications may be made therein without departing from the spirit of the invention or the scope of the appended claims, in which it is intended that the patent shall cover by suitable expression in such claims, all features of patentable novelty residing in the invention.

I claim:

1. The method of treating rubber which comprises incorporating therein an age-resister having the formula $R_1$—O—R—$NH_2$, in which R is alkylene and $R_1$ is aryl.

2. The method of treating rubber which comprises incorporating therein beta-aminoethyl-beta-naphthyl ether.

3. The method of treating rubber which comprises incorporating therein a primary aminoalkyl phenyl ether.

4. The method of treating rubber which comprises incorporating therein a primary aminoalkyl naphthyl ether.

5. The method of treating rubber which comprises incorporating therein an age-resister having the formula $R_1$—O—R—$NH_2$, in which R is alkylene and $R_1$ is aryl and vulcanizing the same.

6. The method of treating rubber which comprises incorporating therein beta-aminoethyl-beta-naphthyl ether and vulcanizing the same.

7. The method of treating rubber which comprises incorporating therein a primary aminoalkyl phenyl ether and vulcanizing the same.

8. The method of treating rubber which comprises incorporating therein a primary aminoalkyl naphthyl ether and vulcanizing the same.

9. A rubber product in which has been incorporated an age-resister having the formula $R_1$—O—R—$NH_2$, in which R is alkylene and $R_1$ is aryl.

10. A rubber product in which has been incorporated beta-amino-ethyl-beta-naphthyl ether.

11. A rubber product in which has been incorporated a primary aminoalkyl phenyl ether.

12. A rubber product in which has been incorporated a primary aminoalkyl naphthyl ether.

13. The method of treating rubber which comprises incorporating therein an age resister having the formula $R'$—O—R—$NH_2$ in which R is alkylene and $R'$ is an aromatic radical selected from the group consisting of phenyl and naphthyl groups.

ALBERT M. CLIFFORD.